(12) United States Patent
Xiao

(10) Patent No.: US 8,585,143 B2
(45) Date of Patent: Nov. 19, 2013

(54) ADJUSTABLE CHILD SAFETY SEAT ASSEMBLY

(75) Inventor: Xiao-Hong Xiao, Central Hong Kong (HK)

(73) Assignee: Wonderland Nurserygoods Company Limited, Hong Kong (HK)

( * ) Notice: Subject to any disclaimer, the term of this patent is extended or adjusted under 35 U.S.C. 154(b) by 474 days.

(21) Appl. No.: 12/848,341

(22) Filed: Aug. 2, 2010

(65) Prior Publication Data

US 2011/0025110 A1  Feb. 3, 2011

(30) Foreign Application Priority Data

Aug. 3, 2009 (CN) .......................... 2009 1 0161179

(51) Int. Cl.
*B60N 2/28* (2006.01)
*A47D 1/00* (2006.01)
(52) U.S. Cl.
USPC ................................ 297/256.16; 297/256.13
(58) Field of Classification Search
USPC ........................................ 297/256.13, 256.16
See application file for complete search history.

(56) References Cited

U.S. PATENT DOCUMENTS 5,551,751 A * 9/1996 Sedlack et al. ............ 297/256.13
5,746,478 A * 5/1998 Lumley et al. ............ 297/256.13
5,890,762 A 4/1999 Yoshida
2007/0046086 A1 * 3/2007 Sakumoto ................ 297/256.13
2009/0072600 A1 * 3/2009 Van der Vegt ............ 297/256.13

FOREIGN PATENT DOCUMENTS

| EP | 0228158 A1 | 7/1987 |
| EP | 0331299 A2 | 9/1989 |
| EP | 0609889 A1 | 2/1994 |
| EP | 0631903 A1 | 6/1994 |
| JP | 63235137 A | 9/1988 |
| JP | 26241 A | 1/1990 |
| JP | 717312 A | 1/1995 |

* cited by examiner

*Primary Examiner* — David Dunn
*Assistant Examiner* — Tania Abraham
(74) *Attorney, Agent, or Firm* — David I. Roche; Baker & McKenzie LLP

(57) ABSTRACT

An adjustable child safety seat assembly comprises a base, a seat adjustable between a plurality of angular positions relative to the base, and a latch mechanism provided between the base and the seat and operable to detachably lock the seat on the base at any one of the angular positions. The latch mechanism comprises a sliding element movable relative to the base and the seat, and at least one resilient arm joined with the sliding element, wherein the resilient arm has a distal end provided with a latching portion. The sliding element is movable in a first direction to drive the resilient arm in movement and displace the latching portion in a second direction for locking the seat with the base.

10 Claims, 9 Drawing Sheets

ADJUSTABLE CHILD SAFETY SEAT ASSEMBLY

CROSS-REFERENCE TO RELATED APPLICATION

This application claims priority of Chinese Application No. 200910161179.8 filed on Aug. 3, 2009.

BACKGROUND OF THE INVENTION

1. Field of the Invention

The present invention relates to a child safety seat assembly, and more particularly to a seat assembly having an adjustable seat portion.

2. Description of the Related Art

FIG. 1 is a schematic view illustrating a conventional automobile seat adjustment mechanism 1. Such mechanism is disclosed in U.S. Pat. No. 5,890,762, the disclosure of which is incorporated herein by reference. The seat adjustment mechanism 1 includes a sliding piece 11 that can be guided in movement by guide posts 12 relative to the fixed base 14. While it slides lengthwise, the sliding piece 11 drives two opposite locking rods 15 to move along inclined slots 17. The sliding engagement between the locking rods 15 and the slots 17 causes each of the locking rods 15 to also shift laterally, such that a distal end of each locking rod 15 can disengage from corresponding recesses on the seat portion (not shown). The seat portion is thereby unlocked, and can be adjusted to a desired recline position.

In the aforementioned mechanism, the lengthwise movement of the locking rods 15 guided by the slots 17 can result the distal ends of the locking rods 15 being urged in contact against the recesses on the seat portion, which increases movement resistance exerted on the locking rods 15 relative to the base 14. As a result, the operation for unlocking the seat portion may not be as smooth as desired. Moreover, the mechanism 1 is relatively complex to assemble, increasing the fabrication cost.

Therefore, there is a need for an adjustable child safety seat assembly that can be manufactured in a cost-effective manner, and prevent address at least the foregoing issues.

SUMMARY

The present application describes an adjustable child safety seat assembly. In one embodiment, the child safety seat assembly comprises a base, a seat movably assembled with the base, and a latch mechanism operable to detachably lock the seat at a desired position on the base. The latch mechanism comprises a sliding element movably assembled in the base, and at least one resilient arm joined with the sliding element, wherein the resilient arm has a distal end provided with a latching portion, wherein the sliding element is movable in a first direction to drive the resilient arm in movement and displace the latching portion in a second direction for engaging with the seat.

In another embodiment, the child safety seat assembly comprises a base, a seat adjustable between a plurality of recline positions relative to the base, and a latch mechanism provided between the base and the seat and operable to detachably lock the seat on the base at one of the recline positions. The latch mechanism comprises a sliding element movable relative to the base and the seat, and at least one resilient arm joined with the sliding element, wherein the resilient arm has a distal end provided with a latching portion. The sliding element is movable in a first direction to drive the resilient arm in movement and displace the latching portion in a second direction for locking the seat with the base.

DETAILED DESCRIPTION OF THE EMBODIMENTS

Figure 1:
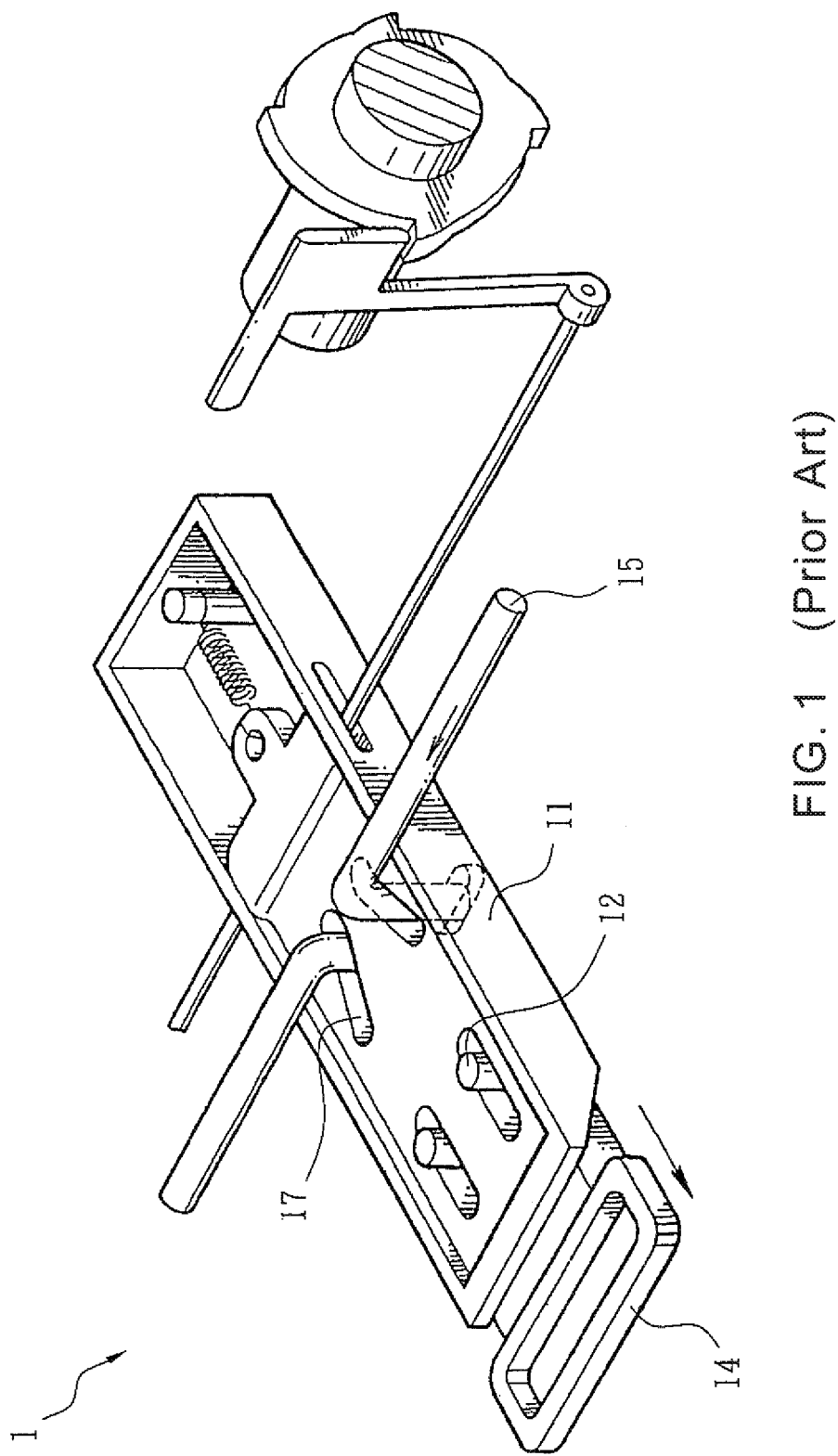
FIG. 1 is a schematic view illustrating a conventional automobile seat adjustment mechanism.
Figure 2:
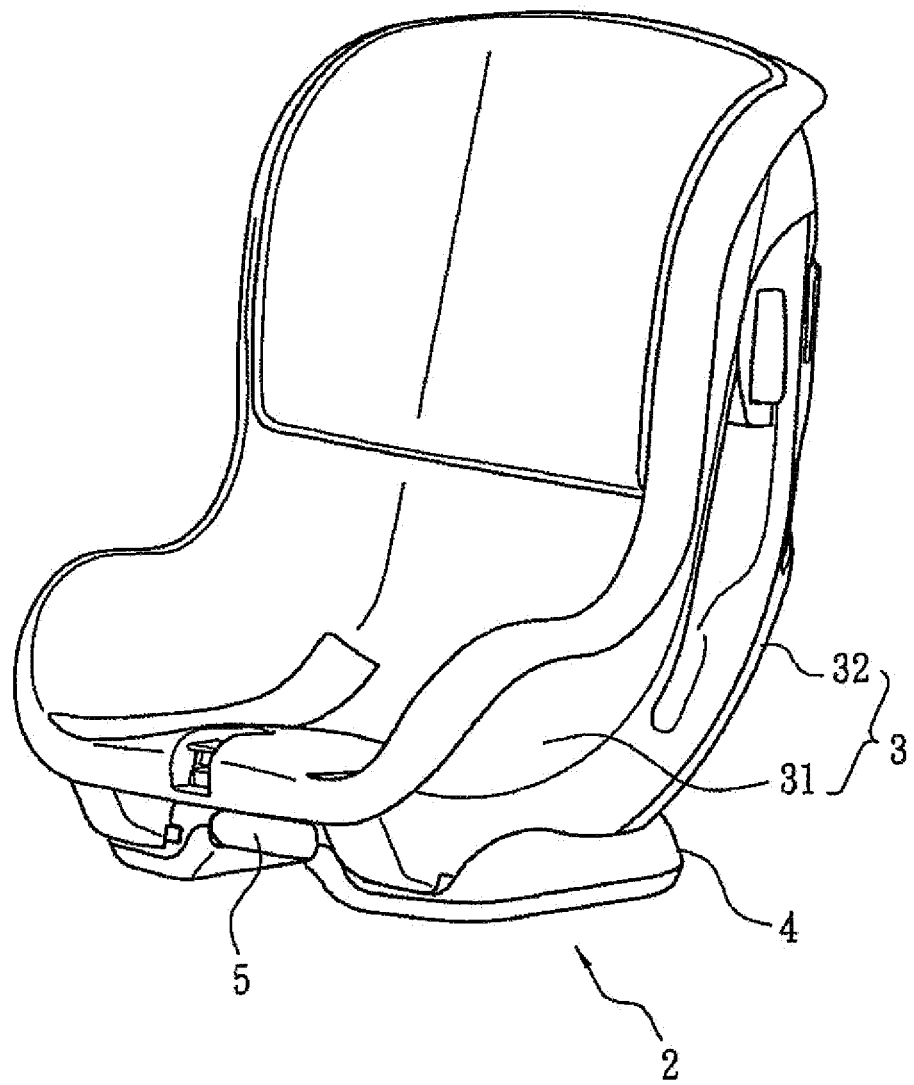
FIG. 2 is a perspective view illustrating one embodiment of a child safety seat assembly.
Figure 3:
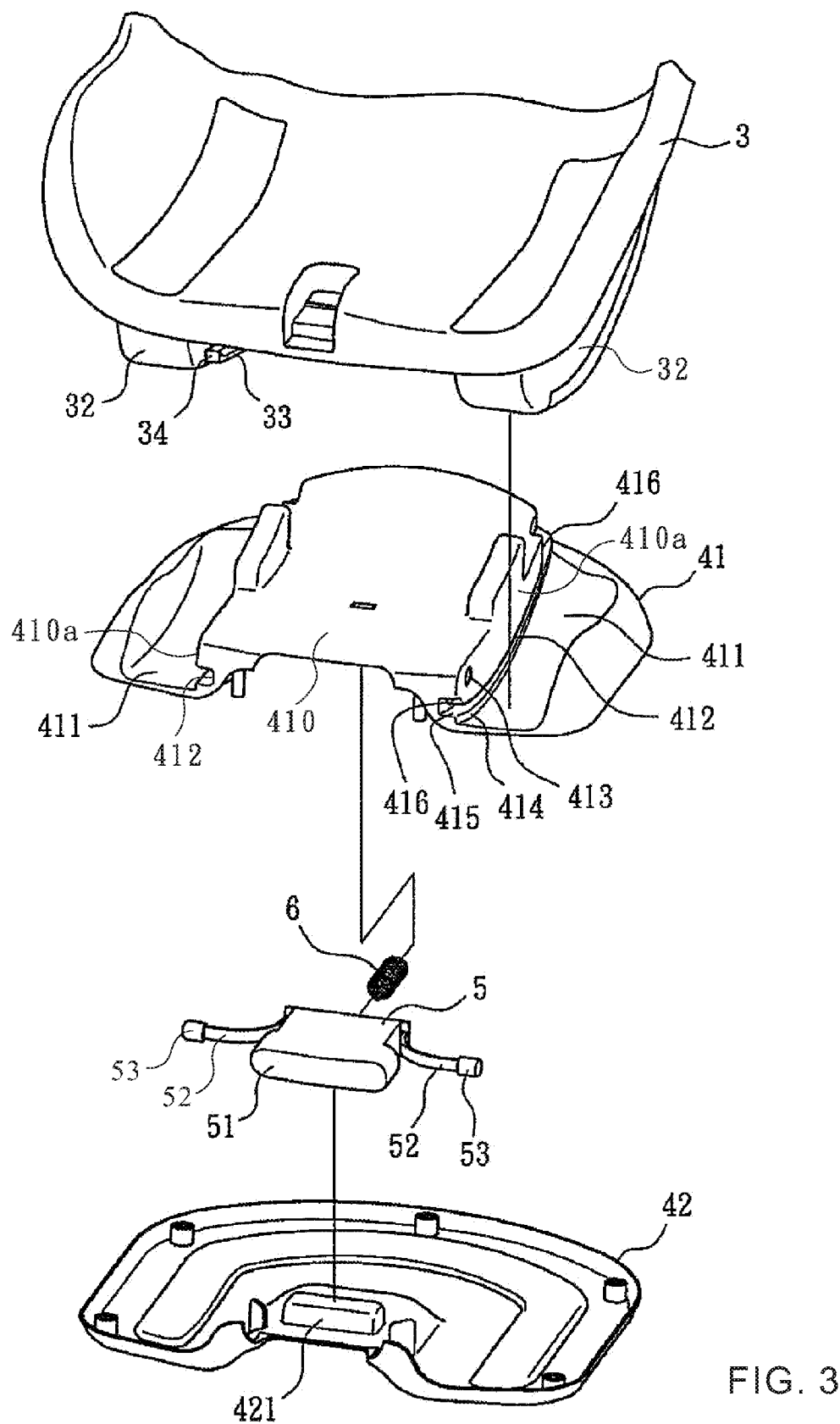
FIG. 3 is an exploded view of the child safety seat assembly shown in FIG. 2.
Figure 4:
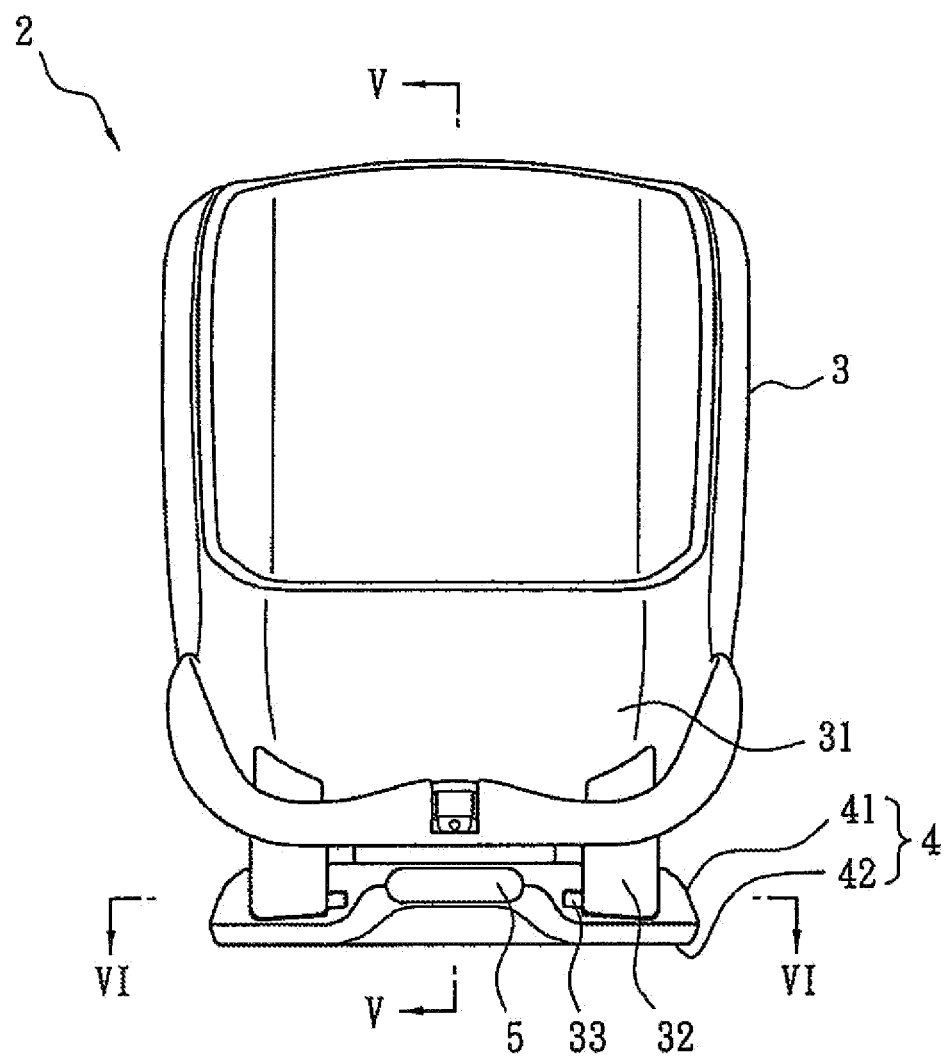
FIG. 4 is a front view of the child safety seat assembly shown in FIG. 2.

FIGS. 2, 3 and 4 are respectively perspective, exploded and front views illustrating one embodiment of an adjustable child safety seat assembly 2. The child safety seat assembly 2 comprises a seat 3, a base 4, and a latch mechanism 5 operable to lock the seat 3 with the base 4. The seat 3 and the base 4 can be configured as separate parts that can be detachably mounted with each other during use, or as two parts that are permanently joined with each other. The latch mechanism 5 can detachably lock the seat 3 at different adjustable reclined positions on the base 4.

Figure 5:
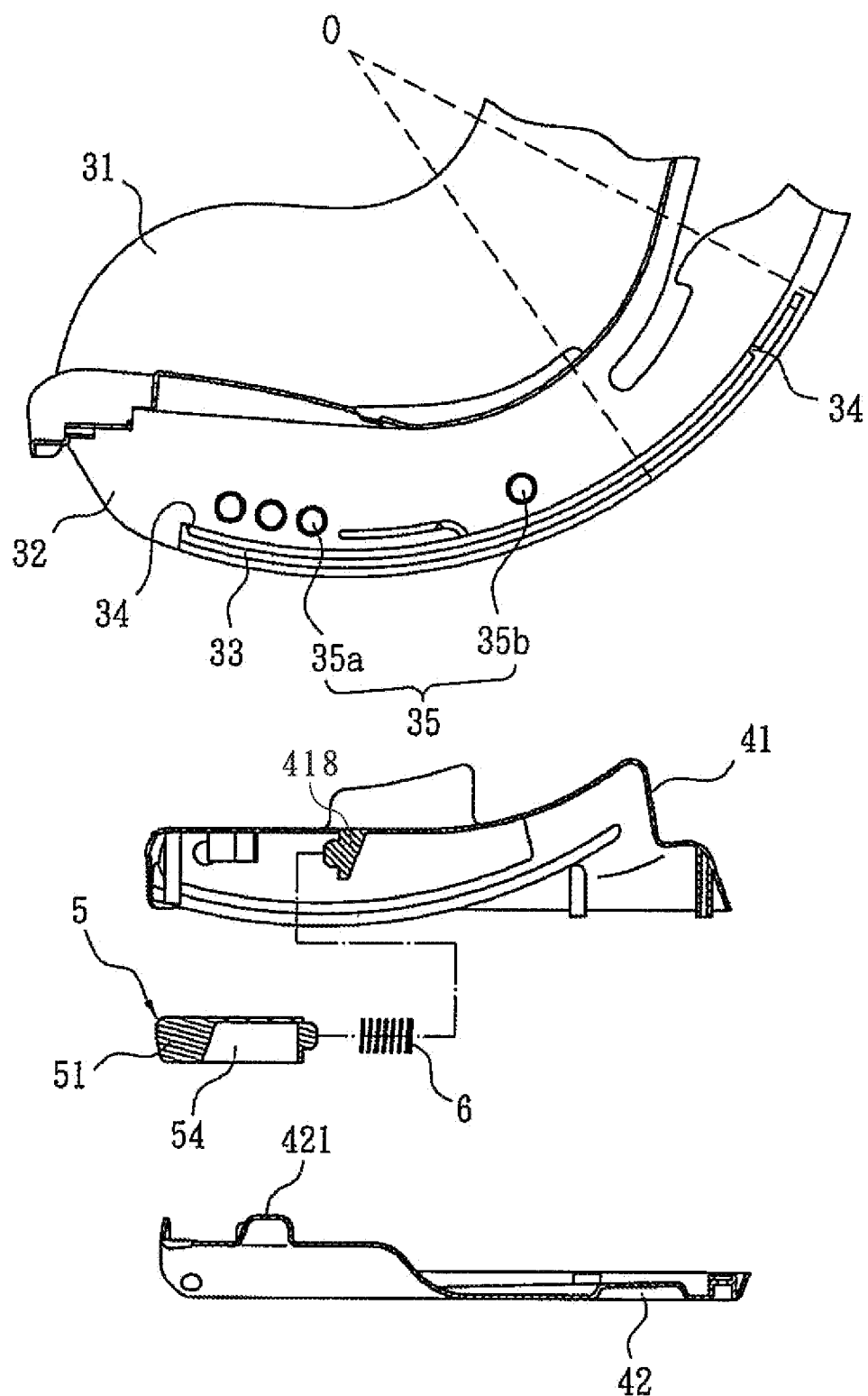
FIG. 5 is an exploded cross-sectional view taken along section line V shown in FIG. 4.

FIG. 5 is an exploded cross-sectional view taken along section line V shown in FIG. 4. As shown in FIGS. 2 through 5, the seat 3 may be formed as a rigid shell comprising a seating portion 31, and two spaced-apart rail portions 32 protruding downward from a bottom of the seating portion 31. The rail portions 32 can be disposed parallel with each other at left and right sides, and respectively have a curved shape extending from a front toward a rear of the seating portion 31. In one embodiment, each rail portion 32 may have an arc shape having a center of curvature O. A plurality of stop abutments 34 may be respectively provided at the front and rear end of each rail portion 32. More specifically, a stop abutment 34 located at the front end of each rail portion 32 may be formed as a protrusion that extends from an inner side of each rail portion 32 and projects upward in an oblique direction. Likewise, the stop abutment 34 located proximate the rear end of each rail portion 32 may be formed as a protrusion of the rail portion 32 that projects approximately in a radial direction toward the center of curvature O. The stop abutments 34 may be formed integrally with the rail portions 32, or as separate parts mounted in proximity of the rail portions 32.

As shown in FIG. 5, an inner side surface of each rail portion 32 can also include a curved flange 33 protruding toward a central area of the seating portion 32, and a plurality of locking locations 35 above the flange 33. Each of the flanges 33 can extend lengthwise along the rail portion 32 with an arc shape similar to that of the rail portions 32 centered on the point O. As shown, the stop abutments 34 may be respectively provided at the front and rear ends of each flange 33. In one embodiment, the locking locations 35 can include three first locking grooves 35a, and a remote second locking groove 35b. When the seat 3 is assembled with the base 4, the rail portions 32 can be in sliding engagement with a matching structure provided on the base 4 for allowing adjustment of the seat 3 relative to the base 4, and the latch mechanism 5 can be operable to engage with any one of the locking locations 35 for locking the seat 3 in place on the base 4.

Referring again to FIGS. 2 through 5, the base 4 includes an upper casing 41 and a lower casing 42 that can be assembled together to delimit an inner space in which the latch mechanism 5 is assembled. An upper side of the upper casing 41 includes an upwardly raised portion 410 located at a central region, and two recessed portions 411 at left and right sides of the raised portion 410. The raised portion 410 has two opposite lateral sidewalls 410a respectively adjacent to the recessed portions 411. The recessed portions 411 are disposed parallel with each other along a lengthwise direction, and respectively have a shape adapted to receive the placement of the rail portions 32.

Each lateral sidewall 410a of the raised portion 410 includes a curved guide slot 412, and an opening 413 located proximate to a front of the raised portion 410 and above the guide slot 412. The guide slot 412 and opening 413 are provided symmetrical on the two opposite lateral sidewalls 410a of the raised portion 410. Each of the guide slots 412 is located above a bottom surface of the adjacent recessed portion 411, separated from the bottom surface of the adjacent recessed portion 411 by a rim portion 414 forming a step shape. In one embodiment, each of the guide slots 412 and recessed portions 411 can have a profile with a curvature that substantially matches with that of the rail portions 32 and flanges 33. When the seat 3 is assembled with the base 4, the rail portions 32 can be accommodated in the recessed portions 411, the raised portion 410 can be placed in a gap between the two rail portions 32, and the flanges 33 of the seat 3 can respectively engage through the guide slots 412 in a sliding manner. As the rail portions 32 and flanges 33 are respectively mounted movable relative to the recessed portions 411 and guide slots 412, the seat 3 can thereby perform adjusting movements along an arcuate path that is approximately centered on the point O.

A front end of each guide slot 412 can have an enlarged opening 415, and end abutments 416 are respectively formed at the front and rear end of each guide slot 412. In one embodiment, the end abutments 416 may be formed as shoulder portions, and one of the end abutments 416 can at least partially delimit a rim of the enlarged opening 415. In order to prevent excessive movements of the seat 3 on the base 4, the front and rear stop abutments 34 provided on the rail portions 32 can respectively come in contact and abut against the corresponding front and rear abutments 416 on the base 4 for respectively limiting forward and backward adjustment of the seat 3.

Figure 6:
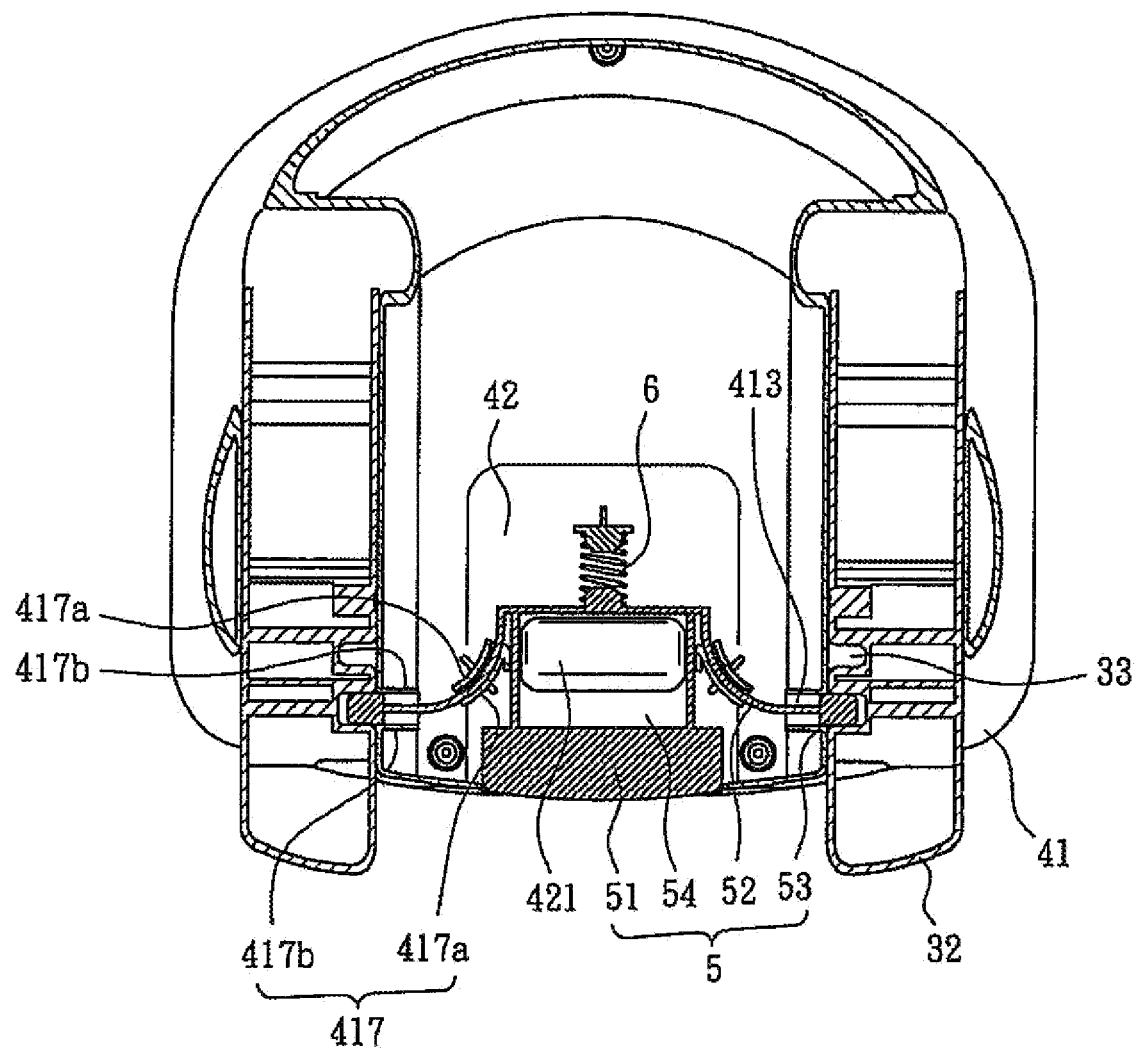
FIG. 6 is a cross-sectional view taken along section line VI shown in FIG. 4.

FIG. 6 is a cross-sectional view taken along section line VI shown in FIG. 4. Referring to FIGS. 3 through 6, the latch mechanism 5 can be assembled between the upper and lower casing 41 and 42 at a position upwardly enclosed by the raised portion 410, and downwardly enclosed by the lower casing 42. The latch mechanism 5 includes a sliding element 51 and a spring 6. The sliding element 51 can have two resilient arms 52 that are respectively joined with opposite lateral sides of the sliding element 51. The resilient arms 52 can extend from the rear toward the front and laterally bend away in opposite directions from a central region of the sliding element 51. Distal ends of the resilient arms 52 respectively form latching portions 53 through which the base 4 can lock with the seat 3. In addition, a rear of the sliding element 51 can include a slot 54 through which the sliding element 51 can be assembled on the lower casing 42 in a slidable manner. In one embodiment, the sliding element 51, including the resilient arms 52 and latching portions 53, may be formed in a single body (e.g., molded plastics), the resilient arms 52 being deformable relative to the sliding element 51.

For assembling the latch mechanism 5, an interior surface of the lower casing 42 facing the upper casing 41 can include a protruding portion 421 at a central region thereof. The sliding element 51 is mounted between the upper and lower casing 41 and 42 with the protruding portion 421 inserted through the slot 54 for achieving a sliding connection. Once assembled, the sliding element 51 can thereby slide back and forth relative to the base 4. The spring 6 is placed in proximity to the rear end of the sliding element 51, one end of the spring 6 being connected with the rear end of the sliding element 51, another end of the spring 6 being connected with an anchor point provided on either of the upper and lower casing 41 and 42 at a location opposite to the rear end of the sliding element 51 (FIG. 5 exemplary illustrates an anchor point 418 formed on the upper casing 41).

As better shown in FIG. 6, the resilient arms 52 and latching portions 53 of the sliding element 51 can be positioned relative to the base 4 via a restraining structure 417. In one embodiment, the restraining structure 417 can be formed on a bottom of the upper casing 41. The restraining structure can include two symmetrical turn sections respectively comprised of ribs 417a, and two symmetrical distal end sections comprised of ribs 417b. A curved portion of each resilient arm 52 can be fitted between the ribs 417a of each turn section, while each latching portion 53 can be positioned between the ribs 417b of the distal end section adjacent to the corresponding opening 413 on the sidewalls 410a of the raised portion 410. The restraining structure 417 thereby positions the resilient arms 52 according to symmetrically bent shapes. When the sliding element 51 is pushed along a first direction (e.g., from front to rear) and drives the resilient arms 52 in movement, the sliding contact of the resilient arms 52 and latching portions 53 with the restraining structure 417 causes local bending of the resilient arms 52 (i.e., at the turn section). As a result, the latching portions 53 are driven to move along a second direction different from the first direction, guided by the distal end section of the restraining structure 417. As shown, the second direction along which the latching portions 53 move (i.e., lateral direction) may be substantially perpendicular to the first direction along which the sliding element 51 moves (i.e., lengthwise direction). Once the latch mechanism 5 is assembled with the base 4, a front end of the sliding element 51 is exposed outward at a front side of the raised portion 410, accessible by a user for operation.

It is worth noting that the assembly of the sliding element 51 can be achieved via other constructions. For example, any of the upper and lower casing can be provided with a protruding structure that engages through the slot 54 of the sliding element 51 for achieving a sliding connection. In alternate embodiments, the restraining structure 417 can also be formed on the lower casing rather than the upper casing.

FIG. 6 shows the latch mechanism 5 in a locked state. When the seat 3 is locked in place on the base 4, the spring 6 biases the sliding element 51 toward a direction that causes the latching portions 53 to extend through the openings 413 outside the base 4 and engage through one pair of opposite locking locations 35 on the rail portions 32 of the seat 3. As a result, adjustment movements of the seat 3 are blocked, and the position of the seat 3 can be securely locked on the base 4 via two symmetrical locking points above the guide slots 412.

Figure 8:
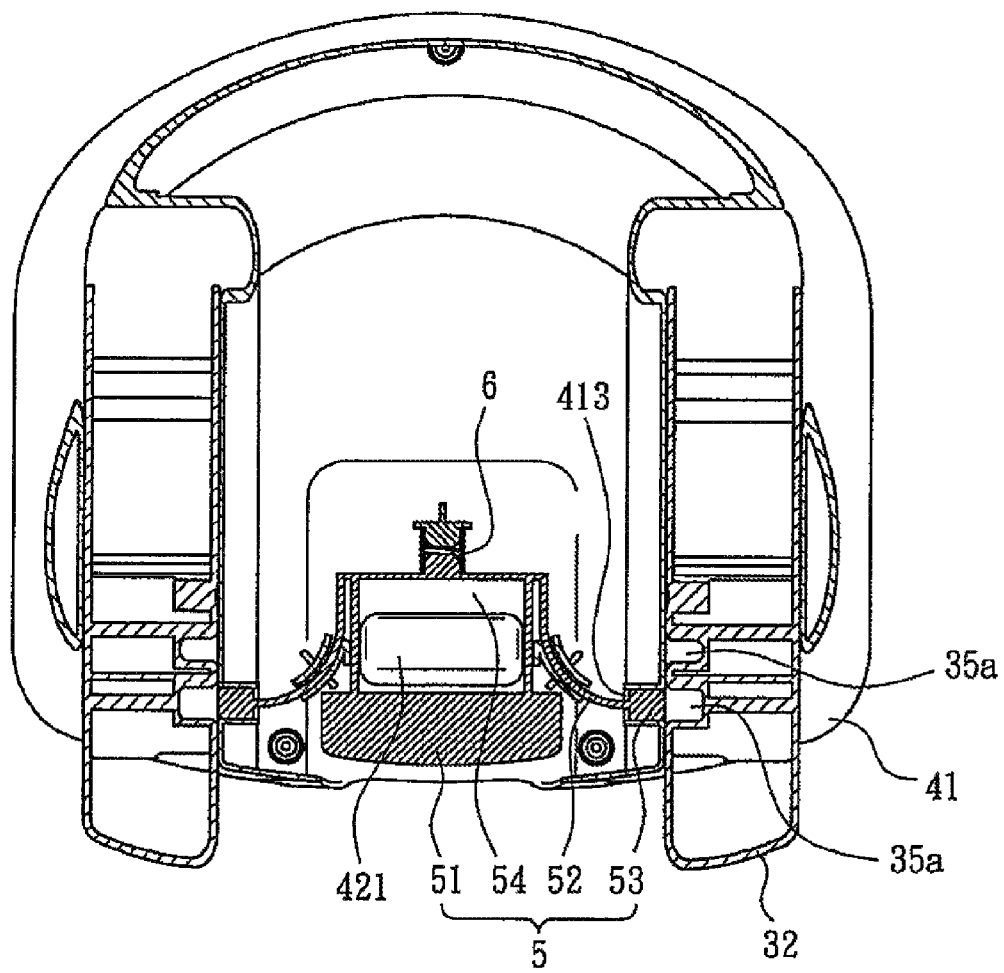
FIG. 8 is a cross-sectional view illustrating the latch mechanism in an unlocked state.

FIG. 8 is a cross-sectional view illustrating the latch mechanism 5 in an unlocked state. When pushed, the sliding element 51 can slide in a rearward direction for compressing the spring 6. This movement of the sliding element 51 pulls the resilient arms 52 backward and cause the resilient arms 52 to deform under sliding contact with the curved ribs 417a. As a result, the resilient arms 52 pull the latching portions 53 to move toward the central region of the base 4 along a direction approximately perpendicular to the sliding direction of the sliding element 51 for laterally disengaging from the locking locations 35 of the seat 3. The user can then move and adjust the seat 3 on the base 4, and release the sliding element 51. Biased by the spring 6, the latching portions 53 may be pushed to abut against the opposite inner sidewalls of the rail portions 32 during adjustment of the seat 3. Once another pair of the locking locations 35 is reached, the spring 6 pushes the sliding element 51 to move further forward, causing the resilient arms 52 to deform under contact with the ribs 417a and push the latching portions 53 to engage with the other pair of the locking locations 35. The seat 3 can be thereby locked at a desired reclined position relative to the base 40.

It is noted that while the seat 3 is adjusted, both of the rail portions 32 and flanges 33 can be respectively in sliding contact with the recessed portions 411 and guide slots 412. More particularly, the engagement of the flanges 33 with the guide slots 412 can prevent lateral displacement of the seat 3 and inadvertent separation of the seat 3 from the base 4. As a result, the seat 3 can be adjusted back and forth in a more stable manner on the base 4.

Figure 7:
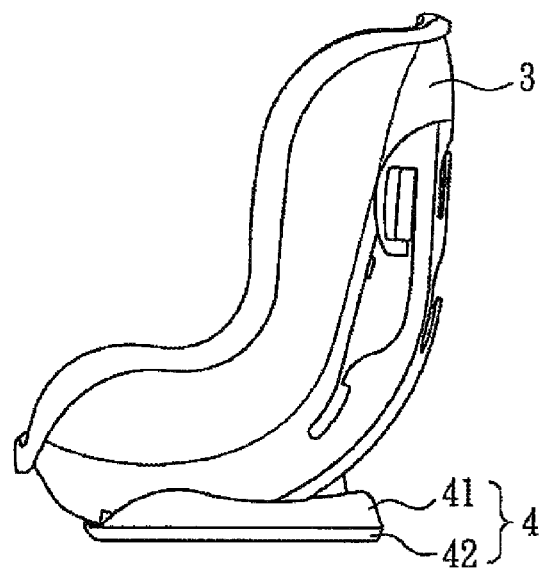
FIG. 7 is a schematic view illustrating the seat locked in a first position substantially erecting upward from the base of the child safety seat assembly.

The seat 3 can be adjusted between a plurality of positions relative to the base 4. For example, FIG. 7 is a schematic view illustrating the seat 3 locked in a first position substantially erecting upward from the base 4. In this first position, the latching portions 53 can engage with one pair of the first locking grooves 35a for securely locking the seat 3 in place.

Figure 9:
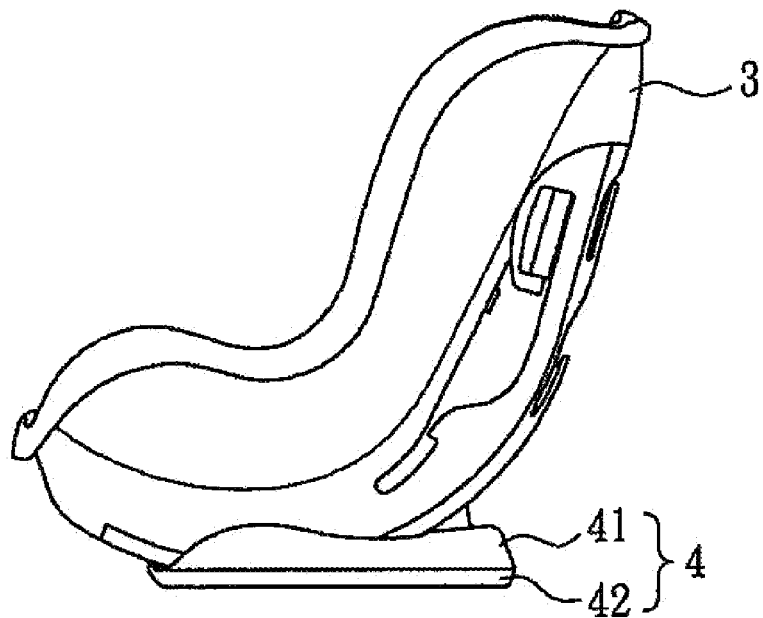
FIG. 9 is a schematic view illustrating the seat locked in an intermediate second position slightly inclined backward from the first position shown in FIG. 7.

FIG. 9 is a schematic view illustrating the seat 3 locked in an intermediate second position slightly inclined backward from the first position shown in FIG. 7. In this second position, the latching portions 53 can engage with another pair of the first locking grooves 35a for securely locking the seat 3 in place.

Figure 10:
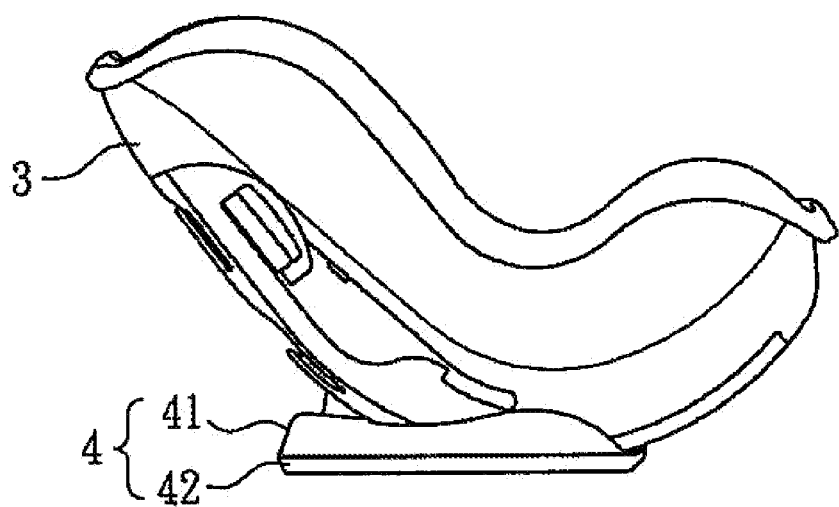
FIG. 10 is a schematic view illustrating the seat locked in a reclined third position.

FIG. 10 is a schematic view illustrating the seat 3 locked in a reclined third position. In the reclined position, the latching portions 53 can engage with the second locking grooves 35b for locking the seat 3. The reclined position may be particularly suitable when the child safety seat assembly 2 is used for seating a child in a car oriented backward, in compliance with current safety regulations.

When the seat 3 is adjusted backward, the stop abutment 34 located at the front of each flange 33 can respectively reach the corresponding enlarged opening 415 and abut against the front end abutment 416 for blocking excessive backward movement that may result in separation of the seat 3 from the base 4. Conversely, when the seat 3 is adjusted forward, the stop abutment 34 located at the rear of each flange 33 can respectively abut against the rear end abutment 416 for blocking excessive forward movement that may result in separation of the seat 3 from the base 4.

At least one advantage of the seat assembly described herein is the ability to adjust the inclination of a seat on a base, and lock the position of the seat via a latch mechanism that is simple in construction. Because the latch mechanism can be fabricated with a reduced number of component parts, the manufacture cost of the child safety seat assembly can be reduced.

Figure 11:
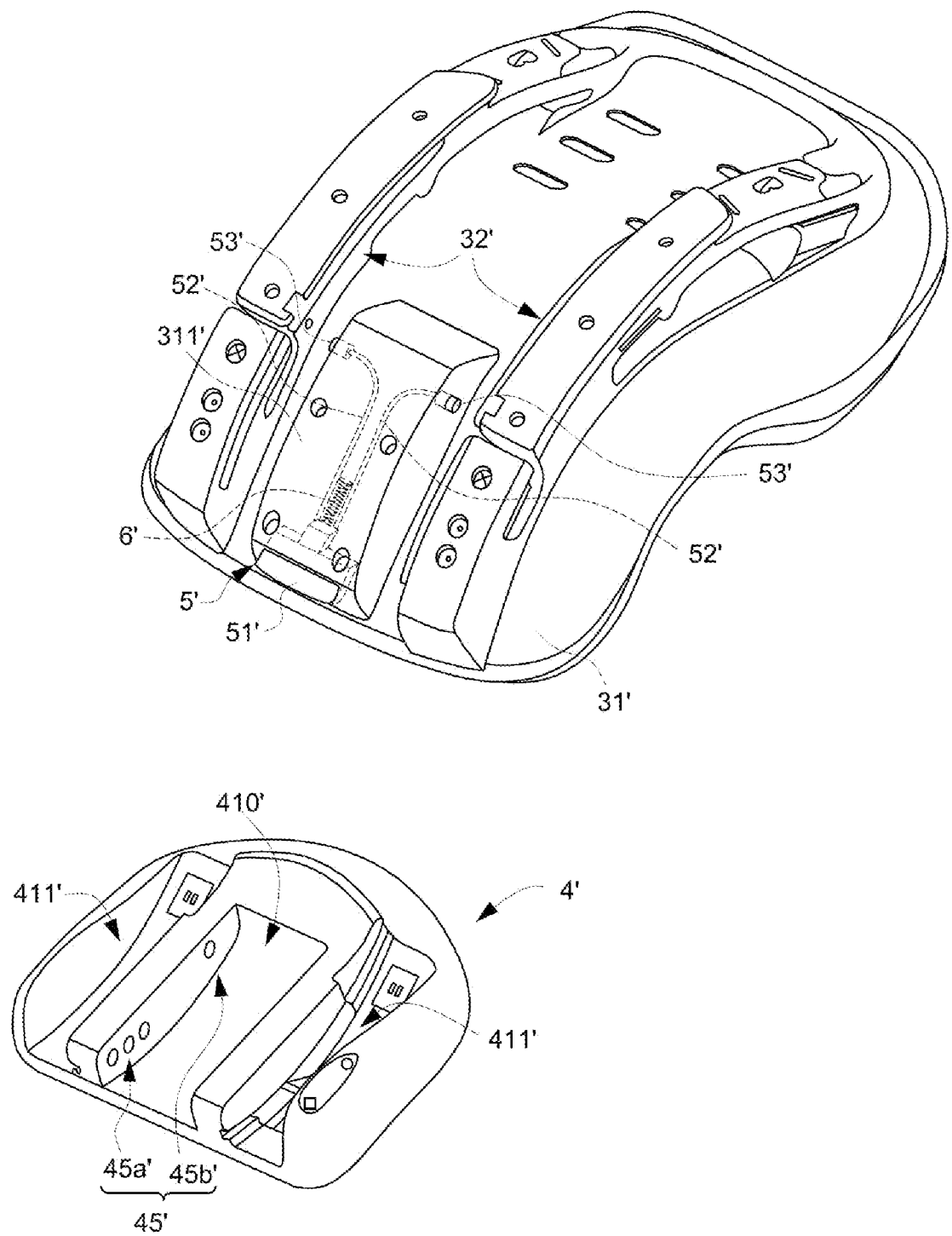
FIG. 11 is a schematic view illustrating another embodiment of a child safety seat assembly.

It is worth noting that the features and advantages provided by the latch mechanism described herein can also be implemented through other constructions. For example, in alternate embodiments, the same latch mechanism may be assembled on the seat rather than on the base. In this case, multiple locking locations may be provided on the base, and the latch mechanism on the seat may be operated to lock the seat with the base once it is adjusted to the desired reclined position. FIG. 11 is a schematic view that illustrates such variant embodiment. The seat 3' can include a seating portion 31' provided with a raised portion 311' that protrudes from a bottom of the seating portion 31' and encloses a latch mechanism 5' between the two rail portions 32'. The latch mechanism 5' can be similar to the latch mechanism 5 in construction, comprising a flexible sliding element 51' and a spring 6' (drawn with dotted lines). The sliding element 51' can have two resilient arms 52' that are respectively joined with opposite lateral sides of the sliding element 51', and latching portions 53' formed at the distal ends of the resilient arms 52'. The resilient arms 52' can extend from the front toward the rear, and bend laterally away in opposite directions from a central region of the sliding element 51'. Like the embodiment described previously, the sliding element 51', including the resilient arms 52' and latching portions 53', may be formed in a single body by molding.

In addition, the latch mechanism 5' may also comprise a restraining structure (not shown for the sake of clarity) that is similar to the restraining structure 417 in construction for guiding movement of the sliding element 51' and latching portions 53' relative to the seat 3'. In turn, the base 4' may include a recessed cavity 410' that is located between the left and right recessed portions 411' at a position corresponding to the raised portion 311'. Two opposite sidewalls of the recessed cavity 410' may comprise a plurality of locking locations 45', which can include three first locking grooves 45a', and a remote second locking groove 45b'.

When the seat 3' is mounted with the base 4', the rail portions 32' and raised portion 311' are respectively lodged in the recessed portions 411' and recessed cavity 410'. The sliding element 51' of the latch mechanism 5' can be pulled toward the front of the seat 3' for laterally disengaging the latching portions 53' from any pairs of the locking locations 45'. Once the unlocked seat 3' is adjusted to the desired inclination relative to the base 4', the sliding element 51' can move toward the rear of the seat 3' under the biasing action of the spring 6', and the latching portions 53' can consequently engage with a new pairs of the locking locations 45' for locking the seat 3' with the base 4'. Because the latch mechanism 5' is placed toward the front of the seat 3', it can be easily accessible and operated by a user.

It is worth noting that the aforementioned embodiments use two resilient arms/latching portions to provide symmetrical locking points on left and right sides of the seat. However, alternate embodiments may also provide one resilient arm/ latching portion such that the seat is locked with the base at only one side (i.e., either left or right side).

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A child safety seat assembly comprising:

a base;

a seat adjustable between a plurality of recline positions relative to the base; and a latch mechanism operable to detachably lock the seat on the base at one of the recline positions, wherein the latch mechanism comprises:

a sliding element assembled with either of the base and the seat, and movable relative to the base and the seat along a lengthwise axis extending from a front to a rear of the seat and the base, the sliding element having an actuating end exposed outward for operation;

at least one resilient arm joined with the sliding element, wherein the resilient arm has a distal end provided with a latching portion; and a spring disposed along the lengthwise axis, the spring having a first end connected with the sliding element, and a second end connected with an anchor point in either of the base and the seat;

wherein the spring is operable to bias the sliding element to move along the lengthwise axis in a first direction to drive the resilient arm in movement and displace the latching portion in a second direction for locking the seat with the base, and wherein pushing against the actuating end of the sliding element causes displacement of the sliding element to compress the spring and to move the latching portion for unlocking the seat from the base.

2. The child safety seat assembly according to claim 1, wherein the sliding element is assembled with the base, the seat includes a plurality of locking locations, and the latching portion is adapted to engage through one of the locking locations for locking a different position of the seat on the base.

3. The child safety seat assembly according to claim 1, wherein the sliding element, the resilient arm and the latching portion are formed in a single body.

4. The child safety seat assembly according to claim 1, wherein the first direction is substantially perpendicular to the second direction.

5. The child safety seat assembly according to claim 1, wherein the sliding element is assembled with the base, and the base includes a restraining structure for positioning the resilient arm relative to the base.

6. The child safety seat assembly according to claim 5, wherein the resilient arm has an elongated shape with a bent portion, and the restraining structure includes a turn section that fits with the bent portion of the resilient arm.

7. The child safety seat assembly according to claim 6, wherein the resilient arm deforms under contact with the restraining structure when the sliding element is driven in movement.

8. The child safety seat assembly according to claim 1, wherein the seat includes at least a flange that engages with a guide slot provided on the base, the flange and the guide slot having curved profiles of a substantially identical curvature, and the flange sliding along the guide slot when the seat is adjusted to a different recline position on the base.

9. The child safety seat assembly according to claim 1, wherein the base includes a pair of recessed portions having an arc profile, the seat includes a pair of rail portions having an arc profile of a curvature substantially identical to that of the recessed portions, the rail portions respectively sliding in the recessed portions when the seat is adjusted to a different recline position on the base.

10. The child safety seat assembly according to claim 1, wherein the sliding element is assembled with the seat, the base includes a plurality of locking locations, and the latching portion is adapted to engage through one of the locking locations.

* * * * *